(12) United States Patent
McClure (10) Patent No.: US 7,069,026 B2
(45) Date of Patent: Jun. 27, 2006

(54) GEOGRAPHIC AREA ASSISTED SYSTEM SELECTION FOR MOBILE STATIONS

(75) Inventor: Kenneth McClure, Irving, TX (US)

(73) Assignee: Nokia Corporation, Espoo (FI)

( * ) Notice: Subject to any disclaimer, the term of this patent is extended or adjusted under 35 U.S.C. 154(b) by 324 days.

(21) Appl. No.: 09/894,046

(22) Filed: Jun. 28, 2001

(65) Prior Publication Data

US 2003/0003922 A1    Jan. 2, 2003

(51) Int. Cl.
*H04Q 7/20* (2006.01)

(52) U.S. Cl. .............................. 455/456.3; 455/435.2; 455/434

(58) Field of Classification Search ............. 455/456.1, 455/456.2, 456.3, 456.5, 457, 422.1, 426.1, 455/435.2, 435.3, 450, 434, 440, 552.1, 160.1, 455/161.1; 340/988, 990, 995, 905, 995.13, 340/995.19, 995.25; 701/208–213; 342/357.13, 342/457; 370/332
See application file for complete search history.

(56) References Cited

U.S. PATENT DOCUMENTS

| | | | |
|---|---|---|---|
| 5,418,537 A | 5/1995 | Bird | |
| 5,422,933 A | 6/1995 | Barnett et al. ................. | 379/60 |
| 5,479,479 A | 12/1995 | Braitberg et al. | |
| 5,677,837 A * | 10/1997 | Reynolds ................. | 455/456.3 |
| 5,786,789 A | 7/1998 | Janky | |
| 5,847,679 A | 12/1998 | Yee et al. | |
| 5,883,598 A * | 3/1999 | Parl et al. ................... | 342/457 |
| 5,940,762 A | 8/1999 | Lee et al. ................... | 455/442 |
| 6,114,336 A | 9/2000 | Blanc-Ferras et al. | |
| 6,121,922 A | 9/2000 | Mohan | |
| 6,127,946 A * | 10/2000 | Tzidon et al. .............. | 340/988 |
| 6,198,406 B1 | 3/2001 | Dorenbosch ........... | 340/825.03 |
| 6,314,295 B1 * | 11/2001 | Kawamoto ................ | 455/456.2 |
| 6,324,404 B1 * | 11/2001 | Dennison et al. ......... | 455/456.1 |
| 6,366,782 B1 * | 4/2002 | Fumarolo et al. ........... | 455/457 |
| 6,477,372 B1 * | 11/2002 | Otting et al. ................ | 455/434 |
| 6,526,090 B1 | 2/2003 | Papasakellariou ........... | 375/136 |
| 6,591,103 B1 * | 7/2003 | Dunn et al. ................. | 455/436 |
| 6,618,594 B1 * | 9/2003 | Myers et al. ................ | 455/457 |
| 6,625,457 B1 * | 9/2003 | Raith ....................... | 455/456.1 |
| 6,643,284 B1 * | 11/2003 | Inoue et al. ................. | 370/352 |
| 6,654,362 B1 | 11/2003 | Palamara .................... | 370/332 |
| 6,662,105 B1 * | 12/2003 | Tada et al. .................. | 701/209 |
| 6,711,408 B1 | 3/2004 | Raith ......................... | 455/440 |

* cited by examiner

*Primary Examiner*—Jean Gelin
(74) *Attorney, Agent, or Firm*—Harrington & Smith, LLP (57) ABSTRACT

A method includes determining a location of a mobile station, comparing the location to information that is descriptive of a map that is stored in the mobile station and deriving at least one system selection parameter from the mobile station's location relative to the map. The system selection parameter can be one or more of a band of frequencies, including a license block, within which the mobile station may obtain access to a desired system, a frequency channel on which the mobile station may obtain access to a desired system, and a protocol to be used by the mobile station to obtain access to a desired system. The system selection parameter can be used to select a public system, or it can be used to select a non-public system. The determination of the location of the mobile station can be performed by the mobile station without assistance from a network operator, or by the mobile station with assistance from the network operator, or by the network operator. In the latter case the determined location is transmitted to the mobile station from the network operator. The map is preferably downloaded from the network operator to a memory of the mobile station.

36 Claims, 5 Drawing Sheets

GEOGRAPHIC AREA ASSISTED SYSTEM SELECTION FOR MOBILE STATIONS

TECHNICAL FIELD

These teachings relate generally to methods and apparatus for providing network selection for mobile terminals, such as cellular telephones, and more specifically relates to techniques for performing mobile station background scanning and other techniques related to system selection.

BACKGROUND

Background scanning is used by several network selection algorithms to enable a mobile station to periodically search for another network. The search can be guided by a number of different criteria set by the network operator and/or by the user. As an example, if a user employs network operator #1 to obtain their service, and if the mobile station is powered up in an area where only network operator #2 is available, the mobile station will register with and camp on a channel of network operator #2. However, the mobile station may periodically leave the channel to network operator #2 to search or scan for a channel provided by network operator #1. This type of operation is typically performed as a background task, and hence can be referred to as background scanning.

Background scanning is very different than cell reselection operations. In cell reselection the mobile station typically scans neighbor cells belonging to the currently selected network operator to locate a cell to which it may immediately, or in the future, hand-off to. A list of neighbor cells to be scanned can be provided by the network and transmitted to the mobile station, and the mobile station may report the results of the neighbor cell scanning operation back to the network.

Background scanning, in contradistinction, provides a mechanism for a primary network operator of the mobile station to force the mobile station to a higher priority network when it is camped on a lower priority network.

Background scanning also involves the mobile station temporarily losing service on the currently registered channel, without the knowledge of the network operator, so that the mobile station can re-tune its receiver to scan for another network operator.

There are two primary problems with background scanning as it is currently performed. The first problem results from the mobile station leaving the registered channel to evaluate other channels in its search for a better network. During the period of time that the mobile station is evaluating other channels, it will miss any messages sent by the base station to which the mobile station is registered sends. This means that the mobile station will miss, by example, pages, short message service (SMS) messages and authentication during background scanning. The second problem results from the periodicity of the background scanning. Since the mobile station will periodically search for better networks while it would normally be camped with its transmitter, digital signal processor (DSP) and central processor unit (CPU) powered down in a sleep mode, the background scanning results in a reduction in battery life. Therefore, it is desirable to reduce the number of background scans that the mobile station perform without locating a better network. This problem is further aggravated by the fact that in some areas there is no better network available. As such, the power consuming background scanning operations will fail to find better service.

If the severity of this problem is reduced by simply increasing the time between background scans, the mobile station is required to reside on a low priority network for a longer period of time. A problem with this situation is that it is possible for the mobile station to camp on a network that does not allow it to receive calls, or that does not allow the mobile station access to desired services.

Thus, in these situations it is imperative that the background scans occur frequently in order to reduce the period without service.

Currently, the decision to enable background scanning is made in the mobile station based upon network identification parameters. Therefore, for time division, multiple access (TDMA) networks, the decision to perform a background scan is based on the System Identifier Code (SID) and the System Operator Code (SOC). These parameters can provide the mobile station with enough information to determine which market (network operator) the mobile station is currently camped on. For example, the mobile station can determine that it is currently located in some metropolitan area. Therefore, if a situation exits where, within the overall metropolitan area, there is one small area (perhaps a border with another market area) that has a higher priority network, the background scanning will be performed within the entire metropolitan area.

The decision to enable background scanning for GSM-type networks is based on the Public Land Mobile Network (PLMN), which gives the identification of the operator and the country. This means that, if a situation exists where, within the United States, there is one small area (perhaps a border with another market area) that has a higher priority, background scanning will be performed in the entire United States. In many cases, forcing background scanning on such a broad scale will result in a very high percentage of unproductive background scans.

Another problem that exists in current system selection approaches relates to finding and selecting non-public systems, such as private and residential systems. The only technique to perform this task now is to recognize the public channels that are used in the vicinity of the non-public system. These channels are stored from the neighbor list of the non-public system and, as a result, the non-public system can only be found when the mobile station 100 is camped in the same license block (in the same set or block of frequencies) as the non-public system. Furthermore, if channel allocation changes around the non-public system, the mobile station will not be able to locate the non-public system automatically.

It can thus be appreciated that there is a need to improve the efficiency of mobile station system selection operations.

SUMMARY

The foregoing and other problems are overcome by methods and apparatus in accordance with embodiments of these teachings.

A method is disclosed for operating a wireless communication system, as is a wireless communications system that is constructed in order to implement the method, as well as a mobile station that operates in accordance with the method. The method includes determining a location of a mobile station, comparing the location to information that is descriptive of a map that is stored in the mobile station and deriving at least one system selection parameter from the mobile station's location relative to the map. The system selection parameter can be one or more of a band of frequencies, including a license block, within which the mobile station may obtain access to a desired system, a frequency channel on which the mobile station may obtain access to a desired system, and a protocol to be used by the mobile station to obtain access to a desired system. The system selection parameter can be used to select a public system, or it can be used to select a non-public system. The determination of the location of the mobile station can be performed by the mobile station without assistance from a network operator, or by the mobile station with assistance from the network operator, or by the network operator. In the latter case the determined location is transmitted to the mobile station from the network operator. The map is preferably downloaded from the network operator to a memory of the mobile station.

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIGS. 2, 3, 4A, 4B and 5 are each a depiction of an exemplary area definition system selection map represented by data stored in the mobile station, wherein

DETAILED DESCRIPTION OF THE PREFERRED EMBODIMENTS

Figure 1:
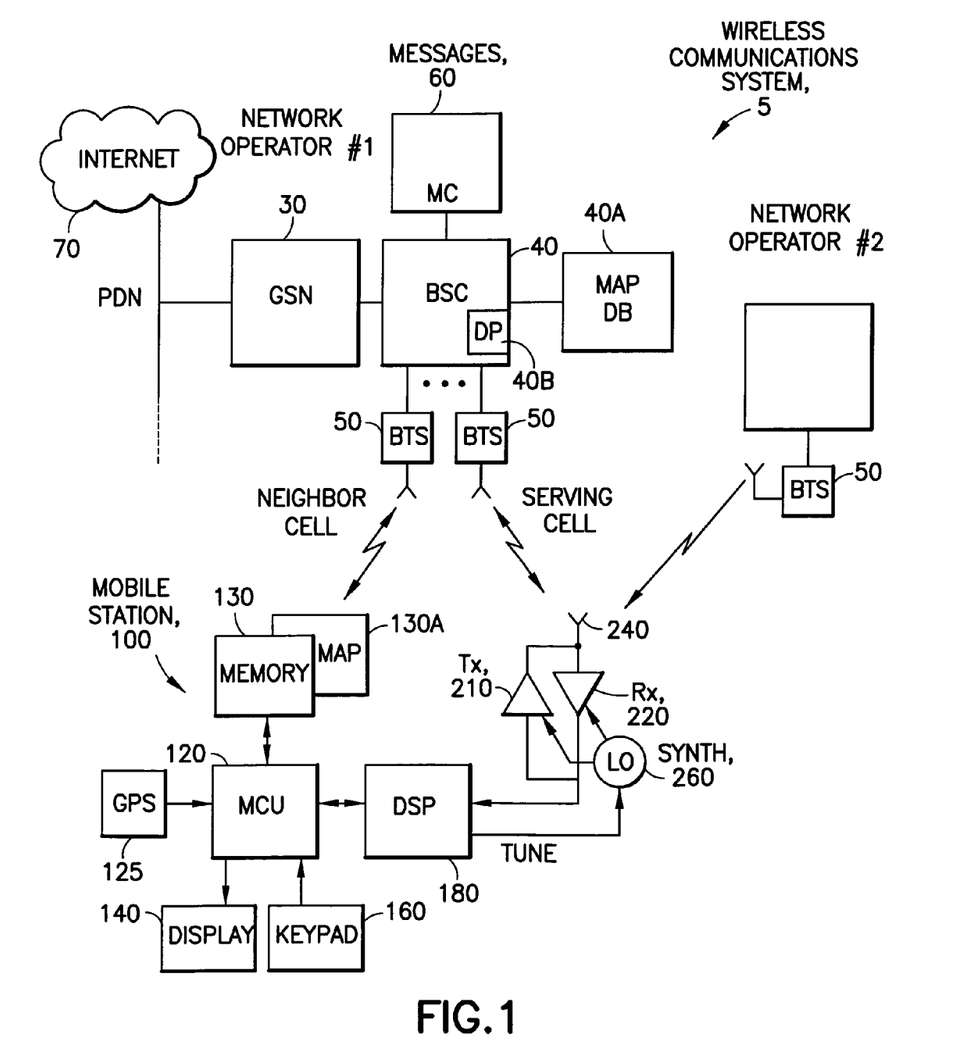
FIG. 1 is block diagram of a wireless communication system that is suitable for practicing these teachings.

Referring first to FIG. 1, there is illustrated a simplified block diagram of an embodiment of a wireless communications system 5 that is suitable for practicing this invention. The wireless communications system 5 includes at least one mobile station (MS) 100. FIG. 1 also shows an exemplary first network operator (network operator #1) having, for example, a GPRS Support Node (GSN) 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. In general, one BTS 50 will provide a serving cell for the mobile station 100, and one or more other BTS 50 will service a neighboring cell or cells. A reverse or uplink communication path also exists from the mobile station 100 to the network operator, which conveys mobile originated access requests and traffic. In an idle mode, the mobile station will be camped on a channel of the BTS 50 of the serving cell.

In a preferred, but not limiting, embodiment of these teachings, the air interface standard can conform to any standard that enables voice and/or data transmissions to occur to the mobile station 100, such as data transmissions enabling Internet 70 access and web page downloads. In one embodiment of this invention the air interface standard is a Time Division Multiple Access (TDMA) air interface that supports a GSM or an advanced GSM protocol and air interface, although these teachings are not intended to be limited to TDMA or to GSM or GSM-related wireless systems.

The first network operator may also include a Message Center (MC) 60 that receives and forwards messages for the mobile stations 100. Other types of messaging service may include Supplementary Data Services and one under currently development and known as Multimedia Messaging Service (MMS), wherein image messages, video messages, audio messages, text messages, executables and the like, and combinations thereof, can be transferred between the network and the mobile station 100.

Service from a second network operator (network operator #2) may also be present in the geographical area that contains the mobile station 100, and the second network operator may or may not be a higher priority network operator than network operator #1. The network operator #2 mat provide the same, more, or fewer services than network operator #1. The network operator #2 may provide a public network or a private network.

The mobile station 100 typically includes a data processor such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received data, data to be transmitted and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to perform geographic area assisted system selection in accordance with these teachings, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor, as well as a wireless transceiver that includes a transmitter 200 and a receiver 220, both of which are coupled to an antenna 240 for communication with the network operator. At least one local oscillator (LO) 260, such as a frequency synthesizer, is provided for tuning the transceiver. Data, such as digitized voice data and/or packet data, is transmitted and received through the antenna 240. The mobile station 100 also receives certain network-related data from the network operator, including network operator originated data, in accordance with an aspect of these teachings, that provides the geographic area assisted system selection, such as maps that are downloaded to a mobile station map memory 130A from a system map database 40A.

Figure 2:
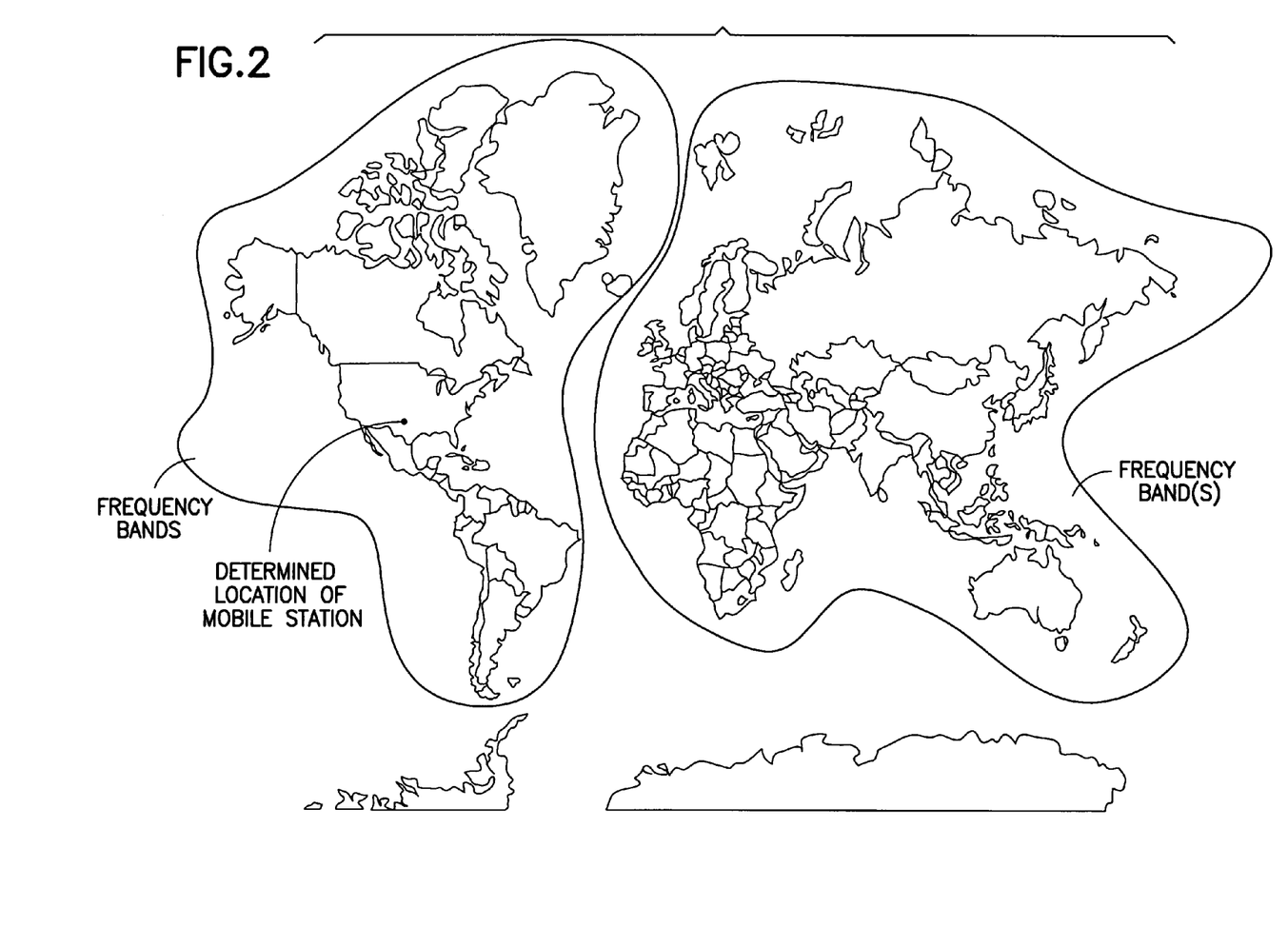
FIG. 2 is a high level area definition map whereby the mobile station is enabled to resolve the frequency band(s) that are in use.
Figure 3:
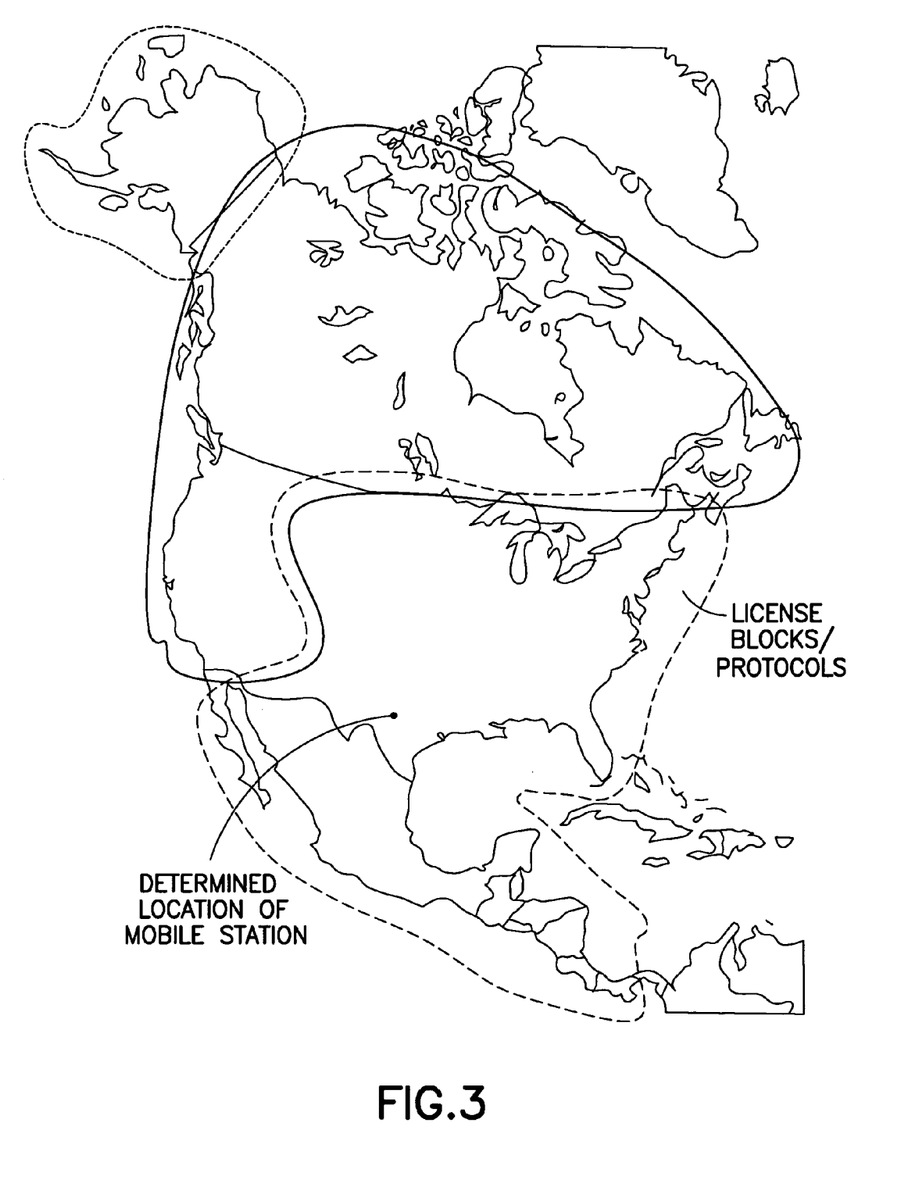
FIG. 3 is a lower level area selection map whereby the mobile station is enabled to resolve the license block(s) and/or protocol(s) that are in use.
Figure 4A:
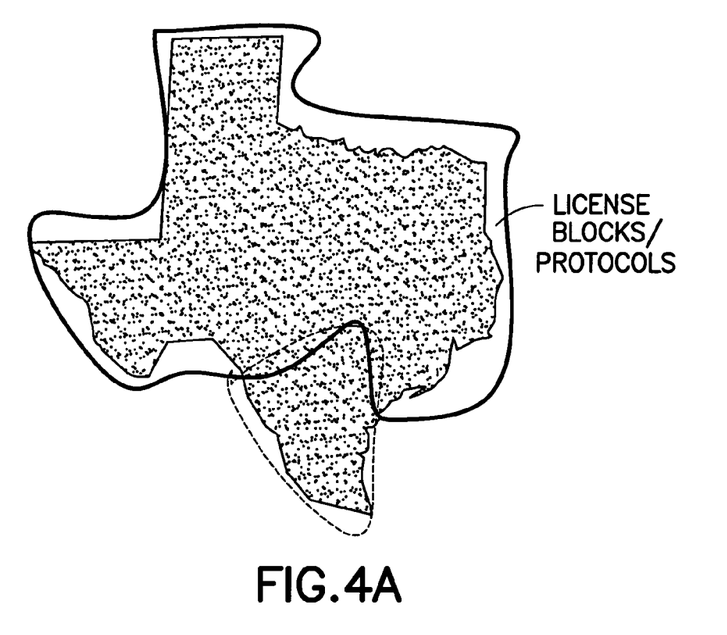
FIGS. 4A and 4B are each a lower level area selection map whereby the mobile station is enabled to resolve the license block(s) and/or protocol(s) that are in use.
Figure 4B:
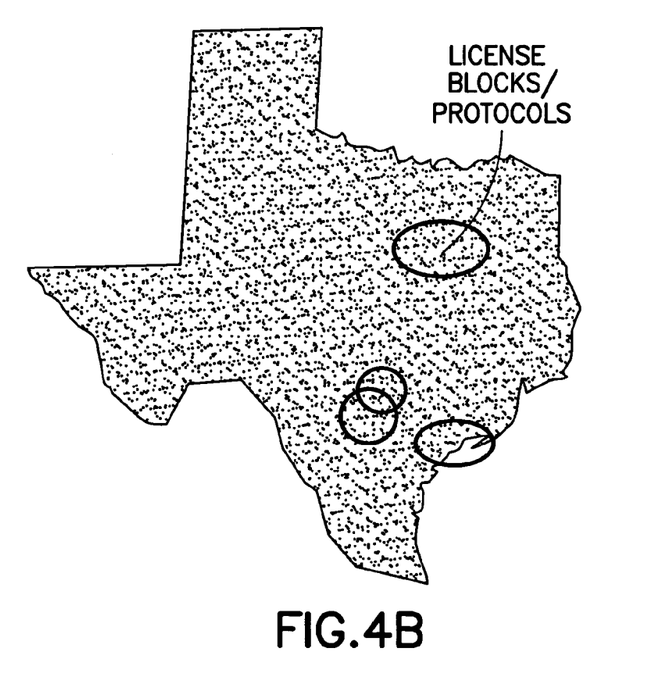
Figure 5:
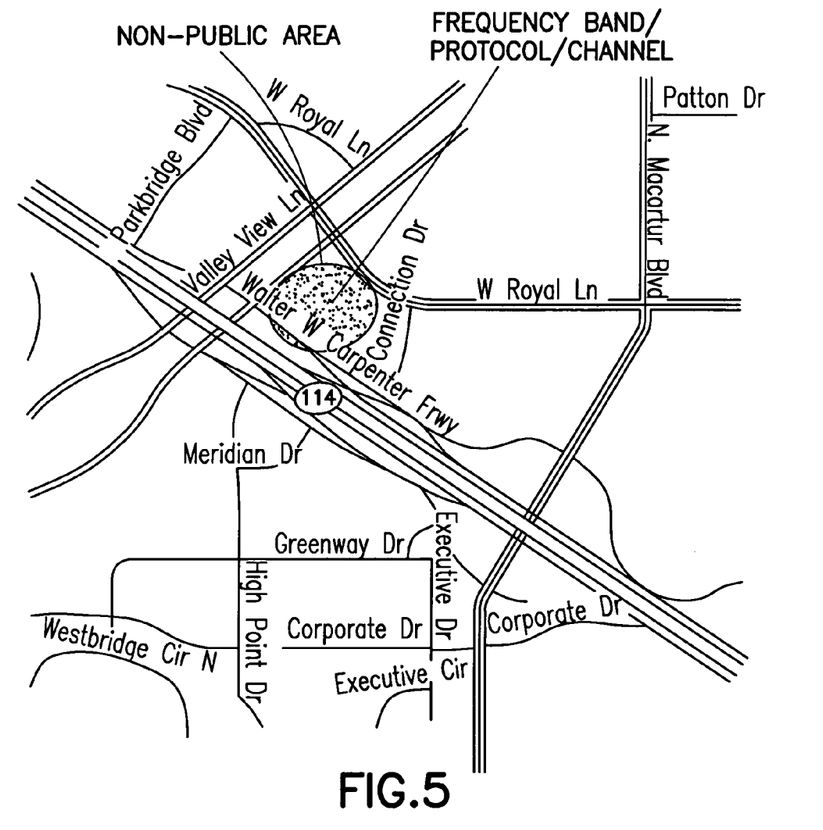
FIG. 5 is a lowest level area selection map whereby the mobile station is enabled to resolve at least one of the frequency band, protocol and frequency channel that can be used to gain system access.

FIGS. 2, 3, 4A, 4B and 5 are each a depiction of an exemplary area definition system selection map represented by data stored in the memory 130A of the mobile station 100. More specifically, FIG. 2 is a high level area definition map (e.g., at the continent or higher level) whereby the mobile station 100 is enabled to resolve the frequency band(s) that are in use, FIG. 3 is a lower level area selection map whereby the mobile station 100 is enabled to resolve the license block(s) and/or protocol(s) that are in use, FIGS. 4A and 4B are each a lower level area selection map (e.g., at the state or province level) whereby the mobile station 100 is enabled to resolve the license block(s) and/or protocol(s) that are in use, while FIG. 5 depicts a lowest level area selection map whereby the mobile station 100 is enabled to resolve the frequency band, protocol and frequency channel that can be used to gain system access. All of these various resolvable parameters may be referred to system selection parameters. Note as well in FIG. 5 that the mobile station 100 is enabled to locate a non-public network area, and by comparing its current location to the location of the non-public network is enabled to determine whether it is possible to obtain service from the non-public network. If not, then considerable wasted system scanning and access attempts are saved.

In accordance with an aspect of these teachings the use of geographic area assisted system selection is used to extend or even replace conventional methods of system selection. The basic concept is to utilize geographical position information to assist the mobile station 100 in selecting the "best" system, where the "best" system is determined by prioritization set by the primary service provider for the mobile station 100 (using a downloadable database). The geographic information may be used to reduce the number of possible protocols (GSM, TDMA, CDMA, etc.), the number of frequency bands (800, 1900, 900, 1800, etc.), license blocks (blocks of allocated frequencies), and specific channels that the mobile station 100 must search in order to find the best system. The scope of the assistance may be varied to accommodate for mobile station location errors and the size of the database stored in the memory 130A. For example, if the location error is so large that a specific area cannot be determined, the use of these teachings may serve to reduce the possible license blocks to search, or to simply designate a protocol (e.g., CDMA or GSM) that is of exclusive interest in the area in question. Furthermore, if the network operator does not wish to supply an extensive database, this method can simply be used to determine the country or continent (e.g., as in FIGS. 2 and 3) in which the mobile station 100 is located in order to eliminate certain protocols and frequency bands from consideration and search. If the location error is sufficiently small, this method may be used as a means to locate non-public systems (as example in ANSI-136), as is shown in FIG. 5.

With regard to the use of an area maps database 40A of the network operator, the system selection database that is downloaded into the mobile station memory 130A may include independent area maps that designate specific system selection information, as shown by example in FIGS. 2, 3, 4A, 4B and 5. This information can be scaled to suit the size of the area. For example, if an area is very large (country/continent sized), this information may simply limit the background scan to certain protocols and frequency bands. If the area represented by the map is small (e.g., about 100 meters), this information could limit the scan to certain protocols, frequency bands, license blocks (if applicable), and specific channels. If the location error causes the possible mobile station 100 position to encompass multiple area maps, the scanning information of every encompassed area map may be used (e.g., as a superset or as a logical OR). These area maps may be dynamically allocated by the network operator from a map database 40A to allow the mobile station 100 to store only those area maps that it requires. Therefore, if a mobile station 100 is forced to use another means to select a system, because it lacked an area map for its current area, it may employ teleservices to receive the required area maps for its surrounding location from the system operator. This technique may also be used to implement hierarchical area maps. For example, an upper level area map dictates scanning behavior in North America, and several lower level area maps could each represent a country, and/or a state region or province within a country. This subdivision may continue down to the channel level. In this case, the mobile station 100 may use teleservices to receive the lowest levels of area maps for its surrounding area, while still using higher level area maps to initially select the system.

With regard now to geographical area determination, this method can be used with any form of a mobile station 100 geographical location system. However, the use of this method is preferred using a geographical location determination method that allows the mobile station 100 to calculate its own position. This includes those cases where the mobile station 100 computes its geographical position completely independently (e.g., such as by using the Global Positioning System or GPS 125), or those cases where the BTS 50 assists the mobile station 100 in making geographical position calculations. These embodiments allow the mobile station 100 to select network operator systems with minimal BTS 50 support (at most receiving signals from the BTS 50). Other methods that require the mobile station 100 to obtain its geographical information from the BTS 50 can be applied as well in this method, but are not the most preferred for initial system selection. This includes those cases where the BTS 50 is solely responsible for determining the location of the mobile station 100, as well as those cases where the mobile station 100 assists the BTS 50 in determining the geographic location of the mobile station 100. This is true because the less preferred embodiments require two-way communication with the BTS 50 to obtain geographical location information, and are thus not as well suited for use in making the initial system selection. However, there use is not as constrained once a system has been selected, and the mobile station 100 is camped on a control channel of the initially selected system (i.e., the BTS 50 derived or assisted location information can then be used for selecting another, more preferred system.

Regardless of the method used to determine the geographic location of the mobile station 100, the mobile station 100 may use the geographic location to find a better system, as defined by service provider prioritization. For example, the serving network operator will consider as a higher priority system one associated with a network provider with which the serving network operator has a satisfactory business arrangement, such as a roaming agreement. This technique can be used as well to locate and select non-public systems.

This ability to locate non-public systems is important, and as was discussed above, the only technique to perform this task currently is to recognize the public channels that are used in the vicinity of the non-public system. These channels are stored from the neighbor list of the non-public system and, as a result, the non-public system can only be found when the mobile station 100 is camped in the same license block as the non-public system. Furthermore, if channel allocation changes around the non-public system, the mobile station 100 will not be able to locate the non-public system automatically.

The geographic system selection method in accordance with these teachings provides a solution to the problem of selecting non-public systems, as the search is based on the geographic location of the mobile station 100, and not only on frequency allocation and neighbor channel list information, as is done conventionally.

Figure 6:
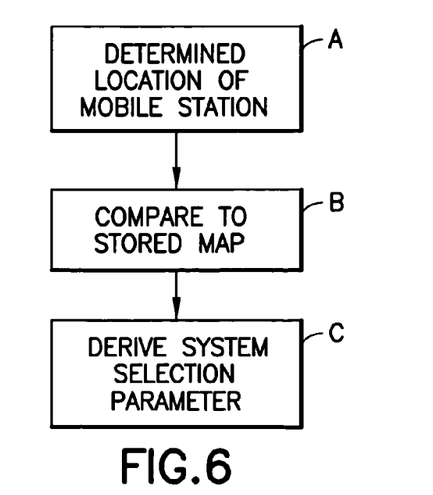
FIG. 6 is a logic flow diagram that is descriptive of a method in accordance with these teachings.

Referring to FIG. 6, it can be appreciated that these teachings provide a method that includes determining a location of the mobile station 100 (Block A), comparing the location to information that is descriptive of the map 130A that is stored in the mobile station (Block B) and deriving at least one system selection parameter from the mobile station's location relative to the map (Block C). The system selection parameter can be one or more of a band of frequencies, including a license block, within which the mobile station may obtain access to a desired system, a frequency channel on which the mobile station may obtain access to a desired system, and a protocol to be used by the mobile station to obtain access to a desired system.

It should be appreciated that the use of these teachings improve the efficiency of system selection, as the performance of unnecessary and unproductive scans can be reduced or eliminated, thereby improving the operation and availability of the mobile station 100, as well as extending battery life.

While these teachings have been particularly shown and described with respect to preferred embodiments thereof, it will be understood by those skilled in the art that changes in form and details may be made therein without departing from the scope and spirit of these teachings.

What is claimed is:

1. A method for operating a mobile station, comprising:
   determining a location of a mobile station;
   comparing the location to information that is descriptive of a map that is stored in the mobile station, the map associating, with different geographical areas, different communication system selection parameters for at least one desired communication system;
   deriving at least one system selection parameter from the mobile station's location relative to the map by which the mobile station may obtain access to the desired communication system;
   wirelessly searching for the desired communication system using the derived at least one system selection parameter; and
   sending voice data from the mobile station through the desired communication system.

2. A method as in claim 1, wherein the system selection parameter is comprised of a band of frequencies within which the mobile station may obtain access to the desired communication system.

3. A method as in claim 1, wherein the system selection parameter is comprised of a frequency channel on which the mobile station may obtain access to the desired communication system.

4. A method as in claim 1, wherein the system selection parameter is comprised of a protocol to be used by the mobile station to obtain access to the desired communication system.

5. A method as in claim 1, wherein the system selection parameter is used to select a public system.

6. A method as in claim 1, wherein the system selection parameter is used to select a non-public system.

7. A method as in claim 1, wherein the determination of the location of the mobile station is performed by the mobile station without assistance from a network operator.

8. A method as in claim 1, wherein the determination of the location of the mobile station is performed by the mobile station with assistance from a network operator.

9. A method as in claim 1, wherein the determination of the location of the mobile station is performed by a network operator, and where the determined location is transmitted to the mobile station from the network operator.

10. A method as in claim 1, wherein the map is downloaded from a network operator to the memory of the mobile station.

11. The method of claim 1, wherein the map associates at least one system selection parameter for each of at least two communication systems in an overlapping geographic area.

12. A mobile station, comprising:
    circuitry for determining a location of a mobile station;
    a data processor for comparing the location to information that is descriptive of a map that is stored in a memory of the mobile station, and for deriving at least one system selection parameter from the mobile station's location relative to the map by which the mobile station may obtain access to a desired communication system, wherein the map associates, with different geographic areas, different communication system selection parameters for at least the desired communication system; and
    a wireless transceiver for wirelessly searching for the desired communication system using the derived at least one system selection parameter.

13. A mobile station as in claim 12, wherein the system selection parameter is comprised of a band of frequencies within which the mobile station may obtain access to the desired communication system.

14. A mobile station as in claim 12, wherein the system selection parameter is comprised of a frequency channel on which the mobile station may obtain access to the desired communication system.

15. A mobile station as in claim 12, wherein the system selection parameter is comprised of a protocol to be used by the mobile station to obtain access to the desired communication system.

16. A mobile station as in claim 12, wherein the system selection parameter is used to select a public system.

17. A mobile station as in claim 12, wherein the system selection parameter is used to select a non-public system.

18. A mobile station as in claim 12, wherein the determination of the location of the mobile station is performed by the mobile station without assistance from a network operator.

19. A mobile station as in claim 12, wherein the determination of the location of the mobile station is performed by the mobile station with assistance from a network operator.

20. A mobile station as in claim 12, wherein the determination of the location of the mobile station is performed by a network operator, and where the circuitry for determining a location comprises a receiver of the transceiver for wirelessly receiving the location from a network operator.

21. A mobile station as in claim 12, wherein the map is downloaded from a network operator to the memory of the mobile station.

22. The mobile station of claim 12, wherein the map associates at least one system selection parameter for each of at least two communication systems in an overlapping geographic area.

23. A mobile station for use with a wireless communication system, comprising a data processor for comparing a location of the mobile station to information that is descriptive of a map that is stored in a memory of the mobile station, wherein the map associates, with different geographic areas, different communication system selection parameters for at least a desired communication system, the data processor further for deriving at least one system selection parameter from the mobile station's location relative to the map by which the mobile station may obtain access to the desired voice communication system.

24. A mobile station as in claim 23, wherein the information is downloaded from a network operator.

25. A mobile station as in claim 23, wherein there are a hierarchy of maps, where a map that is lower in the hierarchy provides more a detailed system selection parameter than a map higher in the hierarchy.

26. A mobile station as in claim 23, wherein the system selection parameter is comprised of at least one of a band of frequencies within which the mobile station may obtain access to the desired voice communication system, a frequency channel on which the mobile station may obtain access to the desired voice communication system and a protocol to be used by the mobile station to obtain access to the desired voice communication system.

27. A mobile station as in claim 23, wherein the map is downloaded from a network operator to the memory of the mobile station.

28. A mobile station as in claim 23, and further comprising means for determining a location of the mobile station.

29. The mobile station of claim 23, wherein the map associates at least one system selection parameters for each of at least two voice communication systems in an overlapping geographic area.

30. A mobile station for use with a wireless communication system, comprising a data processor for comparing a location of the mobile station to information that is descriptive of a map that is stored in a memory of the mobile station, wherein the map associates, with different geographic areas, different communication system selection parameters for at least one wireless voice communication network, the data processor further for deriving a set of at least one search parameter from the mobile station's location relative to the map, the set of at least one search parameter being used by the mobile station to limit a search for the wireless voice communication network.

31. A method as in claim 4, wherein the desired communication system comprises the Internet and the protocol comprises voice over Internet protocol.

32. A mobile station as in claim 15, wherein the desired communication system comprises the Internet and the system selection parameter comprises voice over Internet protocol.

33. A mobile station as in claim 26, wherein the desired voice communication system comprises the Internet and the system selection parameter comprises a voice over Internet protocol.

34. A mobile station as in claim 30, wherein the search parameter limits the search to the Internet, the mobile station further comprising a wireless transceiver, a speaker, and a microphone for conducting voice communications over the Internet using voice over Internet protocol.

35. The mobile station of claim 30, wherein the map associates at least one system selection parameters for each of at least two voice communication systems to an overlapping geographic area.

36. A mobile station comprising:
   a memory for storing a map that associates, with different geographic areas, different communication system selection parameters for at least one wireless voice communication network
   a data processor coupled to the memory for deriving at least one communication system selection parameter by comparing a location of the mobile station to the map;
   a transceiver coupled to the data processor for wirelessly searching for the desired communication system using the derived at least one communication system selection parameter.

* * * * *